Oct. 29, 1968  S. LUTZ  3,407,832
INFLATION VALVE HAVING INTEGRALLY CONNECTED
RESILIENT COVER AND SEAT
Filed June 24, 1965

INVENTOR.
SEPP LUTZ
BY
McGlew & Toren
ATTORNEYS

United States Patent Office 3,407,832
Patented Oct. 29, 1968

3,407,832
INFLATION VALVE HAVING INTEGRALLY CONNECTED RESILIENT COVER AND SEAT
Sepp Lutz, Giengen (Brenz), Germany, assignor to Alligator Ventilfabrik G.m.b.H., Giengen (Brenz), Germany
Filed June 24, 1965, Ser. No. 466,548
Claims priority, application Germany, June 27, 1964, A 46,440
12 Claims. (Cl. 137—223)

ABSTRACT OF THE DISCLOSURE

A method of constructing a pneumatic valve for use, for example, with automobile tires includes the forming of a metallic housing from a metal sleeve which has an outer bore portion of less diameter than an inner bore portion so that a ledge is formed between the two bore portions. In the portion having the wider interior diameter, apertures are defined through the wall thereof directly adjacent the ledge formed between the two bore portions. An outer covering of a resilient material such as rubber is applied around the metal sleeve, and an annular sealing seat of a resilient material such as rubber is formed on the interior of the larger diameter bore portion directly behind the ledge out of the air stream which is joined to the outer cover through the openings formed in the sleeve.

This valve construction is characterized by the fact that an annular valve seal seat is formed by the resilient material directly adjacent the ledge formation at the interior of the sleeve against which a valve plunger or tappet is biased by a spring which is retained at its outer end by an inwardly directed crimping formation of the sleeve.

Summary of the invention

This invention relates, in general, to valves and the method of manufacturing such valves and, in particular, to a new useful valve for pneumatic tires and to a method of forming such a valve.

In known valves for pneumatic tires, it is usual to provide a metal housing having a valve core which is threaded therein and the whole housing is sheathed in an elastic covering particularly a rubber covering. The valve core presents a valve seat against which a valve tappet is pressed by means of a spring. Such a construction provides two separate sealing points, namely the sealing between the valve core and the metal housing and between the valve tappet and the valve core. The sealing surface between the valve core and the metal housing extends in a wedge form obliquely inwardly in the direction of inflation. Embedded dirt particles or damages to the valve core of the metal housing or to the conical rubber packing of the valve core may prevent a perfectly tight seal. The same applies to the second sealing point as the cup rubber gasket of the valve core is generally arranged horizontal to the longitudinal axis of the valve so that the inflowing air impinges on the sealing surface and consequently dirt particles, grains of sand and the like become embedded in locations at which they are not pulled away by the air stream sweeping past.

In accordance with one aspect of the invention, there is constructed a valve having a sealing surface for the valve tappet which extends parallel to the longitudinal axis of the valve or obliquely outwardly in respect to the direction of air flow during inflation. By such a construction, the sealing surfaces of the valve are not located so that they will entrap dirt particles but are instead directly exposed to the inflation air stream which flows outwardly at such location. Any dust or dirt particles which are entrained on the seat portion are swept away by the flowing of air in an even flow stream inwardly during filling. The sealing action is much higher and also more reliable than in the prior art forms.

According to another aspect of the invention, the sealing surface is arranged outside the cross section of the air inlet bore. This provides a further protection against fouling as the main air stream sweeps past the actual sealing surfaces. In a preferred arrangement, the valve seat includes an annular packing of rectangular cross section which is arranged in an undercut offset of the housing surrounding it. The construction is such that the conical part of the valve tappet deforms the elastic packing in cross section so that when under sealing pressure, it forms a generally triangular cross section.

In accordance with a further provision of the invention, the valve is manufactured with a housing formed of a metallic sleeve having openings at the location of the valve seat. An elastic covering of a material such as a rubber surrounds the metal sleeve and an annular seat extends from the interior of the metal sleeve through suitable openings to the exterior covering, the said annular seat being integral with the elastic covering.

The outer end of the metallic housing sleeve is formed with a bendable lip which extends parallel to the interior walls initially to permit the insertion of the valve tappet and the biasing spring, but is bent over to anchor the spring in position upon completion of the assembly. Such a construction and method of assembly provides a distinctive advantage over prior art structures where a large number of parts are required which must be assembled together.

A further advantage of the construction is that only a single sealing point is necessary between the valve tappet and the annular sealing valve seat which is formed by the annular member. The seat is connected through holes in the metal housing to the exterior rubber covering. The metal sleeve forming the housing for the valve tappet is advantageously provided with a narrower bore at its air incoming or inflation inlet side than at its internal end in order to form an intermediate shoulder or abutment for reinforcing the annular sealing seat for the valve tappet which is positioned therebetween.

The spring and valve tappet take support from the deformation of an end lip or offset formed on the housing. Thus, the entire relatively complicated structure of the valve core is eliminated. Of course, cleaning of the valve seat by removal of the parts is no longer possible, but this is not necessary any more as fouling is practically precluded. Moreover, the valves for tubeless tires, which are used to a large extent today are removable, so that it is not necessary to provide a removable valve core. The valve according to the invention, actually consists only of the metal housing with the covering, the valve tappet, and the valve spring, so that the manufacturing costs are greatly reduced. In addition, only one sealing point is necessary and the second sealing point is completely eliminated.

A further advantage is attained in providing the metal housing at the location of the valve seat with radial bores through which the sealing surface of the valve seat may protrude. By this provision, it is possible to apply the covering simultaneously with the formation of the valve seat and further saving in production costs can be achieved. The tappet preferably is made of a polytetrafluoroethylene or a similar anti-adhesive plastic in order to keep the valve tappet free from dirt. In addition, the tappet formation is such that it provides a dirt deviating centering and sealing cone. The valve tappet may consist advantageously of a bright colored plastic to facilitate the application of the tire inflating, deflating and testing devices.

Accordingly, it is an object of this invention to provide an improved valve construction and method of manufacturing the same.

A further object of the invention is to provide a valve which includes a metallic housing having a covering of a material such as rubber which extends through openings of the metallic housing and forms a seat for the valve therein.

A further object of the invention is to provide a valve construction in which the valve seat is formed to flare outwardly in a direction of inflation air flow in order that the seat will remain clean and free from dirt.

A further object of the invention is to provide a method of making a valve which includes forming a separate metallic housing with an opening adjacent an internal ledge portion, applying a covering of material such as rubber around the exterior of the housing, securing an annular valve seat member through the opening in the metallic housing to the cover adjacent the ledge formation of the metallic housing, inserting the valve tappet and spring from the inner end of the metallic housing, and then closing the end to engage the spring after insertion.

A further object of the invention is to provide an improved valve construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figures 1, 2, 3:
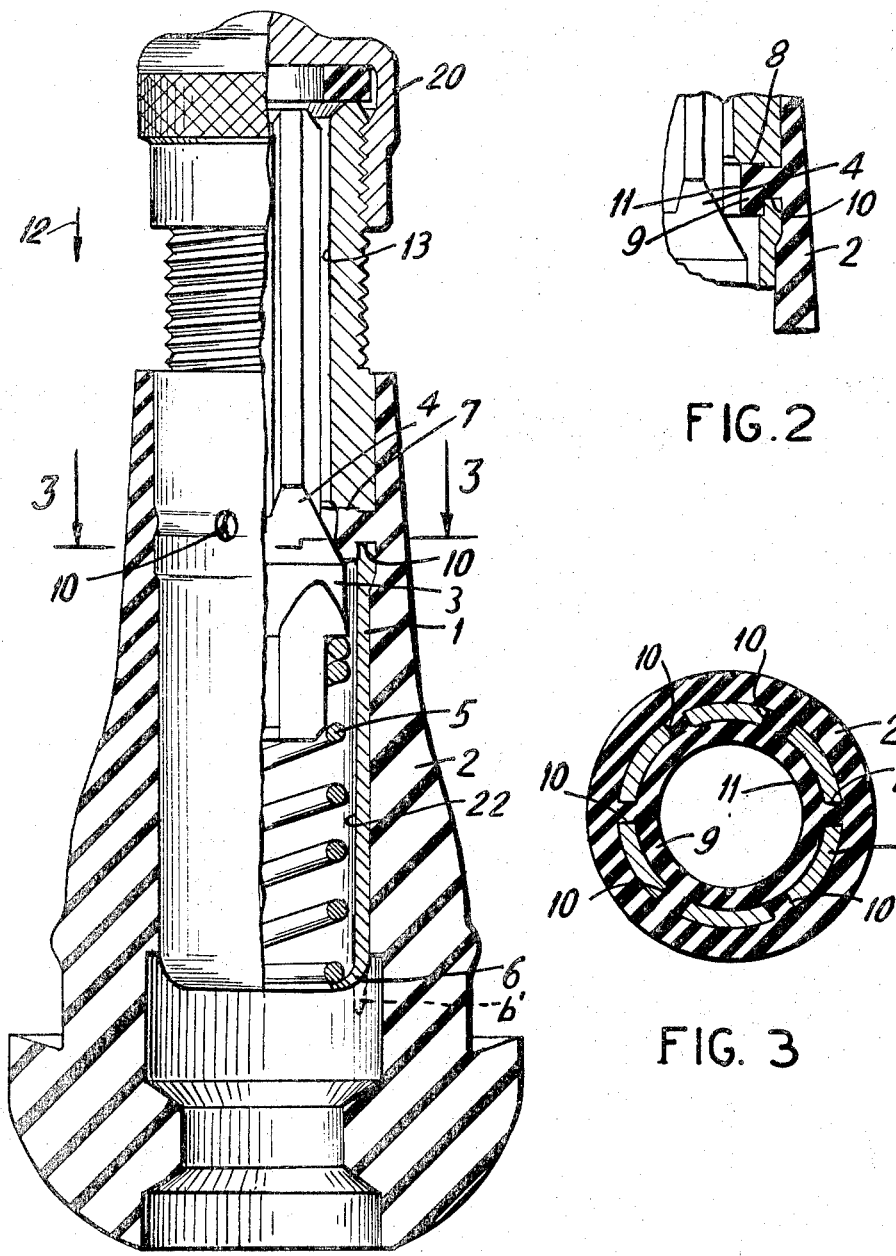
FIG. 1 is a partial longitudinal sectional view with the internal housing sleeve indicated partially in elevation of a valve constructed in accordance with the invention.
FIG. 2 is a detail of a portion of the valve indicated in FIG. 1, showing the parts in the opened position of the valve.
FIG. 3 is a section taken on the line 3—3 of FIG. 1.

Referring to the drawings, in particular, the invention embodied therein comprises a valve with a housing 1 formed as a metal sleeve and with a covering 2 applied around the exterior of the sleeve at least in the lower portion thereof. A cap 20 is threaded over the upper portion of the metallic housing 1.

In accordance with the invention, the housing 1 is formed with an upper entrance bore 13 which has a slightly smaller diameter than a lower interior bore 22 in order to form a ledge 7 which provides a backing for a valve seat. The invention provides a packing or lining 9 for the valve seat which is formed as an annular member of substantially rectangular cross section which fits into an undercut portion 8 on the interior of the wall of the metallic sleeve member 1. The annular packing 9 is of the same material as the exterior cover, such as rubber.

In accordance with a further feature of the invention, a valve tappet 3 which is slidable in the bore 22 of the housing 1 includes an inverted conical upper portion which seats against the annular packing member 9 in the loaded condition and deforms the packing 9 into a substantially triangular sectional shape as indicated in FIG. 1. A spring 5 bears against a shoulder of the tappet 3 and against a lower inwardly bent portion 6 of the housing sleeve 1 to urge the tappet 3 into a closed position in tight engagement on the packing 9.

As indicated in the drawings, the valve seat may be secured to the cover through connections extending through one or at a plurality of bores or openings 10. This results in a very simple manufacturing process. In fact, the packing ring 9 can be applied together with the cover or sheath 2 in one operation such as by spraying the packing ring into the bore against the ledge and through the openings 10 to bond it to the covering 2. In addition, the packing becomes firmly connected with the metallic housing 1 in view of the undercut formation of the housing. When the tappet 3 seats against the annular packing 9, nearly all points of the packing are covered under extreme pressing pressure. This results in a maximum of quiet positioning of the packing and even when high and rapid compressed air streams pass through the packing point. Fluttering of the packing 9 or even loosening from its attachment, as in the known valve cores, is thereby practically eliminated.

As can be seen from the drawing in FIG. 2, the inner packing surface indicated 11 extends substantially parallel to the longitudinal axis of the valve and the direction of inflowing inflation air flow as indicated by the arrow 12. In the loaded position, according to FIG. 1, the surface becomes inclined in a direction outwardly in respect to the direction of air inflation flow. Such a construction precludes an impingement of dirt particles which prevent the sealing action of the valve. In addition, the annular packing lies outside the cross section of the inlet bore 13 so that there is no ledge or other formation upon which an impingement of dirt would be possible.

By the omission of a large number of parts as compared with the known valves, the installation of a strong and exactly working spring is rendered possible. The spring 5 may be so formed that a great closing pressure acts on the two sealing elements 4 and 9 without leaving disadvantageous ruts. In this manner, the sealing safety is also increased.

In addition, the invention insures that the manufacture of the metal housing 1 will be much simpler than heretofore. It may, if desired, be manufactured by a chipless method as a drawn part because the internal bore is of much less complicated construction. Neither is it necessary any more to provide a female thread for the valve core owing to the simplification of the parts as set forth.

A feature of the construction is that after the cover 2 is secured to the housing 1, the tappet 3 with the spring 5 may be inserted in the end which in the drawing of FIG. 1 is bent inwardly at 6. When the sleeve 1 is formed, however, the bent in end 6 is formed in an extended position 6' as indicated in dotted lines. After insertion of the tappet 3 and the spring 5, the end 6' is bent into the configuration indicated at 6 to tightly hold the spring and the tappet in a fixed position within the housing 1.

While a specific embodiment of the invention has been shown and described in detail to illustrate the application of the inventive principles, it will be understood that the invention may be embodied otherwise without departing from such principles.

What is claimed is:

1. A valve construction particularly for pneumatic tires, comprising an elongated hollow metallic sleeve having an inflation inlet at one end with a bore adjacent said inlet end of lesser inner dimension than the remaining portion and defining a ledge at its inner end, a plurality of openings defined in the wall of said sleeve in the remaining portion of the bore of said sleeve directly adjacent the said ledge, a cover surrounding the exterior of said sleeve at least on the area adjacent the openings defined in said sleeve, an annular valve seat of the same material as the cover and of substantially the same internal diameter as the smaller dimension bore so as to define a smooth unobstructed inlet passageway, positioned in juxtaposition with the ledge and being connected with said cover through the openings of said sleeve, a valve tappet having a conical surface bearing against said annular valve seat and forming therewith a sealing surface which extends in a direction outwardly away from said inflation inlet, said sleeve member having an inwardly bent lip adjacent the end opposite from the inflation inlet, and means to bias said tappet into engagement with said annular valve seat, including a spring engaged at one end with said tappet and at its other end with said bent lip.

2. A valve construction particularly for pneumatic tires, comprising an elongated hollow metallic sleeve member having an inflation inlet at one end with a bore adjacent said inlet end of lesser dimension than the remaining portion and defining a ledge at its inner end, a plurality of openings defined in the wall of said sleeve in the remaining portion of the bore of said sleeve directly adjacent the said ledge, a cover surrounding the exterior of said sleeve at least in the area adjacent the openings defined in said sleeve, an annular valve seat member of the same material as the cover and of substantially the same internal diameter as the smaller dimension bore so as to define a smooth unobstructed inlet passageway, positioned in juxtaposition with the ledge and being connected with said cover through the openings of said sleeve, a valve tappet having a conical surface bearing against the annular valve seat and forming therewith a sealing surface which extends in a direction outwardly away from said inflation inlet, and means to bias said tappet into engagement with said annular valve seat.

3. A valve construction particularly for pneumatic tires, comprising an elongated hollow metallic sleeve member having an inflation inlet at one end with a bore adjacent said inlet end of lesser dimension than the remaining portion and defining a ledge at its inner end, a plurality of openings defined in the wall of said sleeve in the remaining portion of the bore of said sleeve directly adjacent the said ledge, a cover surrounding the exterior of said sleeve at least in the area adjacent the openings defined in said sleeve, an annular valve seat of the same material as the cover and of substantially the same internal diameter as the smaller dimension bore so as to define a smooth unobstructed inlet passageway positioned in juxtaposition with the ledge and connected with the cover through the openings of said sleeve, a valve tappet having a conical surface bearing against said annular valve seat and forming therewith a sealing surface which extends in a direction outwardly away from said inflation inlet, and means to bias said tappet into engagement with said annular valve seat, said annular valve seat having an annular internal sealing surface extending substantially perpendicular to the axis of said sleeve and located behind said ledge formation out of the air stream.

4. A valve according to claim 3, wherein said annular valve seat has a substantially rectangular cross section.

5. A valve according to claim 3, wherein said sleeve is undercut, said annular packing being arranged within the undercut portion of said sleeve.

6. A valve construction according to claim 3, wherein the end of said housing is bent inwardly, and said biasing means includes a spring compressed between the inwardly bent portion of said housing and said tappet.

7. A valve construction according to claim 3, wherein said valve tappet is made of polytetrafluoroethylene.

8. A valve construction, according to claim 3, wherein said valve tappet is made of an anti-adhesive plastic and presents a dirt deflecting and centering and sealing cone.

9. A valve construction according to claim 3, wherein said valve tappet consists of a brightly colored plastic.

10. A valve comprising a metallic housing formed as a sleeve having an outer filling bore extending inwardly from one end and an inner air flow bore of larger diameter than said filling bore extending inwardly from the opposite end into communication with said filling bore, an internal ledge therebetween and with an opening through said sleeve at the inner flow bore directly below the ledge, a cover applied around the sleeve exterior, an inner annular valve seat of the same material as the cover bonded to said cover and located behind and in juxtaposition to the interior ledge and being connected with said cover through the opening and of substantially the same internal diameter as the smaller dimension bore so as to define a smooth unobstructed inlet passageway, a valve tappet positioned in said housing in said inner air flow bore for movement back and forth therein and for closing engagement against said annular valve seat in a direction toward said ledge, and a spring biasing said tappet into closing engagement against said valve seat.

11. A valve construction particularly for pneumatic tires, comprising a housing formed as a metallic sleeve having an outer filling bore extending inwardly from one end and an inner air flow bore of larger diameter than said filling bore extending inwardly from the opposite end into communication with said filling bore, said inner air flow bore having at least one opening through the wall thereof, said housing also having an internal ledge formation between said outer filling bore and said inner air flow bore, a cover applied over the exterior surface of said sleeve, an annular valve seat defined in said housing substantially flush with and in juxtaposition to the ledge and connected with said cover and of substantially the same internal diameter as the smaller dimension bore so as to define a smooth unobstructed inlet passageway, and a valve tappet having a conical surface bearing against the valve seat and forming therewith a sealing surface which extends outwardly in a direction away from said inlet opening.

12. A valve for tires, particularly tubeless tires, comprising a metal sleeve casing having a bore of smaller diameter adjacent one end and terminating in a filling opening and a bore of larger diameter than said first bore terminating at the opposite end in an opening for communicating with the interior of the tire, an interior ledge defined between the bores of different diameter, and at least one opening through the wall at the location of the bore of greater diameter and directly adjacent said ledge, an elastic coating enveloping the exterior of said sleeve at least around the portion of larger diameter and around the openings of said sleeve and extending through the openings and forming an annular valve seat behind and in juxtaposition with said ledge portion in the larger diameter portion and of substantially the same internal diameter as the smaller dimension bore so as to define a smooth unobstructed inlet passageway, a valve plunger in said larger diameter portion and spring means biasing said valve plunger against the elastic coating behind said ledge portion, said ledge portion being undercut and said annular valve seat having a substantially rectangular cross section and extending into the undercut portion of said ledge.

References Cited
UNITED STATES PATENTS

| | | | |
|---|---|---|---|
| 2,232,530 | 2/1941 | Hosking | 137—223 |
| 2,248,489 | 7/1941 | Broecker | 137—223 |
| 2,275,820 | 3/1942 | Hosking | 137—224 X |
| 2,862,515 | 12/1958 | Briechle | 137—234.5 |

WILLIAM F. O'DEA, *Primary Examiner.*

DENNIS H. LAMBERT, *Assistant Examiner.*